3,334,082
UREA AND BENZOTHIAZOLIUM COMPLEXES

Walter Reifschneider, Midland, Mich., assignor to The Dow Chemical Company, Midland, Mich., a corporation of Delaware
No Drawing. Filed Mar. 11, 1966, Ser. No. 533,404
16 Claims. (Cl. 260—96.5)

This application is a continuation-in-part of my copending application Ser. No. 431,787, filed Feb. 11, 1965, now abandoned.

The present invention is concerned with organic chemistry and is directed to a complex of (A) a benzothiazolium compound of the formula

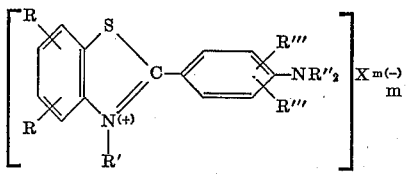

and (B) a urea compound. In the above and succeeding formulae, X represents a pharmaceutically acceptable anion; each R independently represents a member selected from the group consisting of hydrogen, loweralkyl, loweralkoxy, bromo, and chloro; R' represents primary loweralkyl; each R'' independently represents a member selected from the group consisting of hydrogen and primary loweralkyl; each R''' independently represents a member selected from the group consisting of hydrogen, chloro, methoxy, and methyl; and m represents an integer equal to the valence of the anion X.

In the present specification and claims, the unmodified term "loweralkyl" and the term "loweralkoxy" are employed to designate alkyl and alkoxy, respectively, radicals being of from 1 to 4, both inclusive, carbon atoms. The term "primary loweralkyl" is employed in the present specification and claims to designate an alkyl radical being of from 1 to 4, both inclusive, carbon atoms, and having a $CH_2$ group at the point of attachment. Thus, the term "primary loweralkyl" designates methyl, ethyl, n-propyl, n-butyl, and isobutyl. As employed in the present specification and claims, the term "halide" designates chloride, bromide, and iodide, only. The term "urea compound" is employed in the present specification and claims to designate a member selected from the group consisting of urea, thiourea, guanidine, guanidine hydrochloride, and biuret, only.

The present complex of benzothiazolium compound and urea compound exists as a 1:1 complex, that is, one molecule of benzothiazolium compound and one molecule of urea compound; as a 2:1 complex, that is, two molecules of benzothiazolium compound and one molecule of urea compound; or as a 1:2 complex, that is, two molecules of urea compound and one molecule of benzothiazolium compound. In this description, as generally throughout the present specification, the term "benzothiazolium compound" designates the entire compound described foregoing as (A) and having m units of the positive benzothiazolium radical; hence a 1:1 complex comprises more than one positive benzothiazolium radical wherever m=an integer in excess of 1.

Thus the complex of the present invention can be said to be of the following formula:

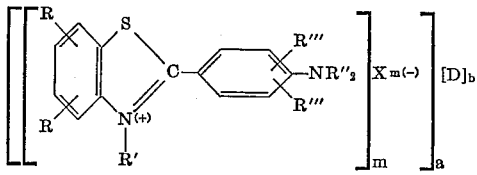

wherein D represents a urea compound, that is, a compound selected from the group consisting of urea, thiourea, guanidine, guanidine hydrochloride, and biuret; and each of the symbols a and b represents an integer being of from 1 to 2, both inclusive, the sum of a and b being an integer of from 2 to 3, both inclusive.

The primary attribute of the pharmaceutically acceptable anion (X) is non-toxicity. The choice of the anion is not critical, although a given anion may in some instances exhibit special advantages, due to solubility, ease of crystallization, lack of objectionable taste and the like. Representative pharmaceutically acceptable anion moieties include the following: bromide, iodide, sulfate, bisulfate, acetate, salicylate, chloride, valerate, oleate, phenate, laurate, borate, benzoate, lactate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate, cinnamate, stearate, and the like.

The complex of the present invention can exist as a hydrate, ordinarily as a hemihydrate, monohydrate, or dihydrate, and it is frequently convenient to prepare and separate a given product of the present invention as a hydrate. However, regardless of the ratio of complex of benzothiazolium compound and urea compound, or of the existence of the complex as a hydrate, all products of the present invention share similar properties and are prepared by the same synthetic methods hereinbelow taught.

The products of the present invention are crystalline solid materials. They are prepared by reacting together the benzothiazolium compound, as previously defined as being of the formula

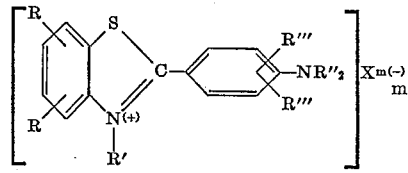

or its hydrate, with the urea compound, also as previously defined.

The reaction is conveniently carried out by contacting the reactants in an inert liquid reaction medium. Preferably, an organic liquid is employed as inert liquid reaction medium. Suitable reaction media include water; the loweralkanols, such as methanol, ethanol, and isopropanol; and the loweralkyl ketones, such as acetone and methyl ethyl ketone.

The reaction goes forward under temperatures of a wide range, but is preferably carried out at temperatures of from about 20° C. to the boiling temperature of the reaction medium employed. The reaction can be conducted under pressures which are subatmospheric or superatmospheric, but no advantage is thereby gained; therefore, the reaction is ordinarily conducted at atmospheric pressures.

The reaction proceeds with the production of some of the desired product when the reactants are employed in any amounts. When it is desired to prepare a product in which the complex is of a given ratio, it is preferred to employ the reactants in approximately those amounts which are consumed in the preparation of the given ratio of complex. In the instance of a 1:1 complex, equimolecular proportions of the reactants are consumed. In the instance of a 1:2 complex, one molecular proportion of benzothiazolium compound and two molecular proportions of urea compound are consumed; and in the instance of a 2:1 complex, two molecular proportions of benzothiazolium compound and one molecular proportion of urea compound are consumed.

In carrying out the reaction, the reactants are mixed and contacted together in any manner, conveniently by adding one reactant to the other reactant. Thereafter, the resulting reaction mixture can be maintained for a period of time in the reaction temperature range to complete the reaction, although the reaction ordinarily goes to completion with the completion of the contacting together of the reactants. The product appears as a precipitate in the reaction mixture. This product can be separated by filtration or decantation. If desired, the separated product can be purified by washing with inert liquid reaction medium or by recrystallization.

Most of the complexes of the present invention form hydrates upon even brief contact with water. However, when it is desired to obtain a hydrate form of any complex which is not initially hydrated, such hydrate is prepared by mixing the complex with water, permitting the mixture to stand for a period of time, and separating the resulting hydrate, or by exposing the complex to moist atmosphere over a period of time. When it is desired to employ as active agent a complex which is not a hydrate, the corresponding complex hydrate is dehydrated by any of the known hydration procedures, such as oven-drying, drying in the presence of a desiccating agent, and the like.

The following examples illustrate the best manner now known for the practicing of the present invention, and will enable those skilled in the art to practice the present invention.

*Example 1.—2-(p-dimethylaminophenyl)-3,6-dimethylbenzothiazolium chloride 1:1 complex with urea*

2 - (p - dimethylaminophenyl) - 3,6 - dimethylbenzothiazolium chloride monohydrate (200 grams; 0.60 mole) was dissolved in 500 milliliters of methanol and the resulting solution heated to boiling temperature. A second solution of 50 grams of urea (0.83 mole) in 1000 milliliters of methanol was prepared and heated. Thereafter, the second solution was added to the first solution and the resulting reaction mixture permitted to cool to room temperature. During the cooling, the 2-(p-dimethylaminophenyl)-3,6-dimethylbenzothiazolium chloride 1:1 complex with urea precipitated in the reaction mixture. The product precipitate was separated from the reaction mixture by filtration, the separated product washed with methanol, and the washed product air-dried. The product, which exists as a monohydrate, is a yellow crystalline solid melting with decomposition at 213.5–215.5° C. Elemental analysis of the product was made. Found: C, 54.52 percent; H, 6.66 percent; Cl, 8.65 percent. Calculated for $C_{18}H_{23}ClN_4OS \cdot H_2O$: C, 54.46 percent; H, 6.35 percent; Cl, 8.93 percent.

*Example 2.—2-(p-dimethylaminophenyl)-3,6-dimethylbenzothiazolium chloride 1:2 complex with urea*

2 - (p - dimethylaminophenyl) - 3,6 - dimethylbenzothiazolium chloride monohydrate (650 grams; about 2 moles) was dissolved in 12 liters of 95 percent ethanol, and the resulting solution heated to boiling temperature. A second solution of 310 grams of urea (about 5 moles) in 3 liters of methanol was prepared and heated. Thereafter, the second solution was added to the first solution, and the resulting reaction mixture permitted to cool to room temperature. During the cooling, the 2-(p-dimethylaminophenyl)-3,6-dimethylbenzothiazolium chloride 1:2 complex with urea precipitated in the reaction mixture. The product precipitate was separated from the reaction mixture by filtration, the separated product washed with ethanol, and the washed product air-dried. The product, which exists as a hemihydrate, is a yellow crystalline solid melting with decomposition at 223–224.5° C. Elemental analysis of the product was made. Found: C, 50.96 percent; H, 6.10 percent; Cl, 7.48 percent; N, 18.41 percent; S, 7.22 percent. Calculated for $C_{19}H_{27}ClN_6O_2S \cdot \frac{1}{2}H_2O$: C, 50.94 percent; H, 6.30 percent; Cl, 7.92 percent; N, 18.76 percent; S, 7.16 percent.

*Example 3.—2-(p-dimethylaminophenyl)-3,6-dimethylbenzothiazolium chloride 1:2 complex with biuret*

2 - (p - dimethylaminophenyl) - 3,6 - dimethylbenzothiazolium chloride monohydrate (32 grams; about 0.1 mole) was dissolved in 400 milliliters of ethanol and the resulting solution heated to boiling temperature. A second solution of 13 grams of biuret (0.13 mole) in 650 milliliters of ethanol was prepared and heated. Thereafter, the second solution was added to the first solution and the resulting reaction mixture permitted to cool to room temperature. During the cooling, the 2-(p-dimethylaminophenyl)-3,6-dimethylbenzothiazolium chloride 1:2 complex with biuret precipitated in the reaction mixture. The product precipitate was separated from the reaction mixture by filtration, the separated product washed with ethanol, and the washed product purified by recrystallization from ethanol. The product is a yellow crystalline solid melting with decomposition at 217–219° C. Elemental analysis of the product was made. Found: C, 47.65 percent; H, 5.76 percent; Cl, 6.71 percent. Calculated for $C_{21}H_{29}ClN_8O_4S$: C, 48.04 percent; H, 5.57 percent; Cl, 6.75 percent.

In view of the foregoing teachings and examples, those skilled in the art will be enabled to prepare all of the products of the present invention. Representative products include the following:

From 2 - (p - dimethylaminophenyl) - 3,6 - dimethylbenzothiazolium acetate and urea, 2-(p-dimethylaminophenyl)-3,6-dimethylbenzothiazolium acetate 1:1 complex with urea dihydrate, melting with decomposition at 211–212° C.

From 2 - (p - dimethylaminophenyl) - 3,6 - dimethylbenzothiazolium chloride monohydrate and guanidine hydrochloride, 2-(p-dimethylaminophenyl)-3,6-dimethylbenzothiazolium chloride 1:1 complex with guanidine hydrochloride, melting with decomposition at 241–243° C. Elemental analysis of the product was made. Found: C, 47.84 percent; H, 5.97 percent; Cl, 15.57 percent. Calculated for $C_{18}H_{25}Cl_2N_5S \cdot 2H_2O$: C, 47.94 percent; H, 6.49 percent; Cl, 15.74 percent.

From 2 - (p - dimethylaminophenyl) - 3,6 - dimethylbenzothiazolium phenate, and biuret, 2-(p-dimethylaminophenyl)3,6-dimethylbenzothiazolium phenate 1:1 complex with biuret, having a molecular weight of 480.

From 2 - (p - dimethylaminophenyl) - 6 - chloro - 3 - methylbenzothiazolium iodide and urea, 2-(p-dimethylaminophenyl) - 6 - chloro - 3 - methylbenzothiazolium iodide 2:1 complex with urea, having a molecular weight of 881.5.

From 2 - (p - dimethylaminophenyl) - 3,6 - dimethylbenzothiazolium choloride monohydrate and thiourea, 2 - ( p - dimethylaminophenyl) - 3,6 - dimethylbenzothiazolium chloride 1:2 complex with thiourea, melting with decomposition at 229–231° C. Elemental analysis was made. Found: C, 48.68 percent; H, 6.03 percent; Cl, 7.40 percent; N, 18.10 percent. Calculated for $C_{19}H_{27}ClN_6S_3$: C, 48.44 percent; H, 5.78 percent; Cl, 7.53 percent; N, 17.84 percent.

From 2 - (p - methylaminophenyl) - 3 - methylbenzothiazolium sulfate and thiourea, 2-(p-methylaminophenyl)-3-methylbenzothiazolium sulfate 1:1 complex with thiourea, having a molecular weight of 682.9.

From 2 - (p - dimethylaminophenyl) - 3 - methylbenzothiazolium chloride and biuret, 2-(p-dimethylaminophenyl)-3-methylbenzothiazolium chloride 1:1 complex with biuret, having a molecular weight of 407.9.

From 2 - (p - dimethylaminophenyl) - 3,6 - dimethylbenzothiazolium (1,2,-benzisothiazolin-3-one 1,1-dioxide) salt and urea, 2-(p-dimethylaminophenyl)-3,6-dimethylbenzothiazolium (1,2-benzisothiazolin-3-one 1,1-dioxide) salt 1:1 complex with urea, melting with decomposition at 223–226.5° C.

From 2 - (4 - diethylamino - 3 - chlorophenyl) - 3-methylbenzothiazolium bromide and urea, 2-(4-diethylamino - 3 - chlorophenyl) - 3 - methylbenzothiazolium bromide 1:1 complex with urea, having a molecular weight of 471.9.

From 2 - (4 - dimethylamino - m - tolyl) - 3 - methylbenzothiazolium chloride and urea, 2-(4-dimethylamino-m-tolyl)-3-methylbenzothiazolium chloride 1:2 complex with urea, melting with decomposition at 186° C.

From 2 - p - aminophenyl) - 3,6 - dimethylbenzothiazolium chloride and use, 2(p-aminophenyl)-3,6-dimethylbenzothiazolium chloride 1:2 complex with urea, having a molecular weight of 410.9.

From 2 - (p - dimethylaminophenyl) - 3,5,6 - trimethylbenzothiazolium chloride and urea, in amounts representing equimolecular proportions, 2-(p-dimethylaminophenyl) - 3,5,6 - trimethylbenzothiazolium chloride 1:1 complex with urea, having a molecular weight of 393.0. Employing the same reactants in amounts representing one molecular proportion of benzothiazolium compound and two molecular proportions of urea compound, there is obtained the 2-(p-dimethylaminophenyl)-3,5,6-trimethylbenzothiazolium chloride 1:2 complex with urea, having a molecular weight of 453.0.

From 2 - (2,5 - dichloro - 4 - diethylaminophenyl) - 3,5,6 - trimethylbenzothiazolium iodide and thiourea, 2-(2,5 - dichloro - 4 - diethylaminophenyl) - 3,5,6 - trimethylbenzothiazolium iodide 1:1 complex with thiourea, having a molecular weight of 611.5.

From 2 - (4 - di - n - propylamino - 6 - chloro - m - tolyl)-3,6-diethylbenzothiazolium hydrogen sulfate and guanidine hydrochloride, 2-(4-di-n-propylamino-6-chloro-m-tolyl)-3,6-diethylbenzothiazolium hydrogen sulfate 1:1 complex with guanidine hydrochloride, having a molecular weight of 576.6.

From 2 - (p - dimethylaminophenyl) - 3,6 - dimethylbenzothiazolium tartrate and urea, 2-(p-dimethylaminophenyl)-3,6-dimethylbenzothiazolium tartrate 1:1 complex with urea, melting with decomposition at 201–203° C.

From 2- (4 - di - n - butylamino - 3 - methoxyphenyl)-6 - n - butyl - 4 - chloro - 3 - n - propylbenzothiazolium methyl sulfate and urea, 2-(4-di-n-butylamino-3-methoxyphenyl) - 6 - n - butyl - 4 - chloro - 3 - n - propylbenzothiazolium methyl sulfate 1:1 complex with urea, having a molecular weight of 673.4.

From 2 - (p - dimethylaminophenyl) - 6 - isopropyl-4-methoxy-3-n-butylbenzothiazolium n-butyl sulfate and thiourea, 2 - (p - dimethylaminophenyl) - 6 - isopropyl-4-methoxy-3-n-butylbenzothiazolium n-butyl sulfate 1:1 complex with thiourea, having a molecular weight of 612.9.

From 2 - p - dimethylaminophenyl) - 3,6 - dimethylbenzothiazolium bromide and urea, 2-(p-dimethylaminophenyl)-3,6-dimethylbenzothiazolium bromide 1:1 complex with urea, melting with decomposition at 222–223.5° C. Elemental analysis was made. Found: 51.40 percent; H, 5.45 percent; N, 13.10 percent. Calculated for $C_{18}H_{23}BrN_4OS$: C, 51.06 percent; H, 5.47 percent, N, 13.23 percent.

From 2 - (p - dimethylaminophenyl) - 3 - ethylbenzothiazolium phosphate and guanidine, 2 - (p - dimethylaminophenyl) - 3 - ethylbenzothiazolium phosphate 1:1 complex with guanidine, having a molecular weight of 1004.3.

From 2 - (4 - diethylamino - 3,5 - xylyl) - 5,6 -diethoxy - 3 - isobutylbenzothiazolium dihydrogen phosphate and biuret, 2 - (4 - diethylamino - 3,5 - xylyl) - 5,6-diethoxy - 3 - isobutylbenzothiazolium dihydrogen phosphate 1:1 complex with biuret, having a molecular weight of 655.8.

From 2 - (p - diisobutylaminophenyl) - 6 - n -butoxy-3 - methylbenzothiazolium p - toluenesulfonate and urea, 2 - (p - diisobutylaminophenyl) - 6 - n - butoxy - 3-methylbenzothiazolium p - toluenesulfonate 1:1 complex with urea, having a molecular weight of 656.9.

From 2 -(p - dimethylaminophenyl) - 3,6 - dimethylbenzothiazolium citrate and urea, 2 - (p - dimethylaminophenyl) - 3,6 - dimethylbenzothiazolium citrate 1:1 complex with urea, melting with decomposition at 166–168° C.

From 2 - (4 - dimethylamino - 2,5 - dimethoxyphenyl)-5,6 - dibromo - 3 - methylbenzothiazolium iodide and thiourea, 2 - (4 - dimethylamino - 2,5 -dimethoxyphenyl)-5,6 -dibromo - 3 - methylbenzothiazolium iodide 1:1 complex with thiourea, having a molecular weight of 690.3.

From 2 - (p - dimethylaminophenyl) - 3,6 - dimethylbenzothiazolium iodide and urea, 2 - (p - dimethylaminophenyl) - 3,6 -dimethylbenzothiazolium iodide 1:1 complex with urea, melting with decomposition at 225–227° C. Elemental analysis was made. Found: C, 46.20 percent; H, 5.22 percent; I, 27.0 percent; N, 11.70 percent. Calculated for $C_{18}H_{23}IN_4OS$: C, 45.97 percent; H, 4.93 percent; I, 27.0 percent; N, 11.91 percent.

From 2 - (p - dimethylaminophenyl) - 3,6 - dimethylbenzothiazolium oleate and thiourea, 2 - (p - dimethylaminophenyl) - 3,6 - dimethylbenzothiazolium oleate 1:1 complex with thiourea, having a molecular weight of 641.

From 2 - (4 - dimethylamino - m - tolyl) - 6 - chloro-3,4 -dimethylbenzothiazolium methanesulfonate and thiourea, 2 - (4 - dimethylamino - m - tolyl) - 6 - chloro-3,4 - dimethylbenzothiazolium methanesulfonate 1:1 complex with thiourea, having a molecular weight of 503.1.

From 2 - (p - dimethylaminophenyl) - 3,6 - dimethylbenzothiazolium salicylate and urea, 2 - (p - dimethylaminophenyl) - 3,6 -dimethylbenzothiazolium salicylate 1:1 complex with urea, having a molecular weight of 481.

From 2 - (p - diethylaminophenyl) - 4,7 - dichloro - 3-ethylbenzothiazolium bromide and urea, 2 - (p - diethylamino) - 4,7 - dichloro - 3 - ethylbenzothiazolium bromide 1:1 complex with urea, having a molecular weight of 530.4.

From 2 - (4 - diethylamino - m - tolyl) - 3 - ethylbenzothiazolium malate and guanidine hydrochloride, 2- (4 - diethylamino - m - tolyl) - 3 -ethylbenzothiazolium malate 2:1 complex with guanidine hydrochloride, having a molecular weight of 1011.

From 2 - (p - ethylmethylaminophenyl) - 3,6 - dimethylbenzothiazolium chloride and guanidine, 2 - (p-ethylmethylaminophenyl) - 3,6 - dimethylbenzothiazolium chloride 1:1 complex with guanidine, having a molecular weight of 392.0.

The products of the present invention are useful for the control of undesirable aquatic crustaceans such as Daphnia, particularly in bodies of water which have defined boundaries and which are managed with regard to the aquatic life they support. They are also useful as gastropod ovicides, that is, as agents to kill the egg state of gastropods such as snails and slugs.

In addition, the products are useful as agents to improve the health of warm-blooded animals. In one embodiment, the products are incorporated in animal feeds; in such usage, the products improve the growth characteristics of the animals generally and, in particular, control organisms which are internal parasites upon the animals. In another embodiment, the control of these parasites can also be achieved by contacting the parasites in their infective phase outside of the host body.

In representative operations, 2 - (p - dimethylaminophenyl) - 3,6 - dimethylbenzothiazolium iodide 1:1 complex with urea was dispersed in water to prepare an aqueout treating composition containing 2 parts of the subject compound per mililon parts by weight of ultimate aqueous treating composition. Immediately after the preparation of the composition, Daphnia were placed in the composition for a period of about 24 hours. At the end of the period, the composition was examined to determine the percent kill and control of Daphnia, and it was found that there was a 100 percent kill and control of Daphnia. The same results were obtained when the following compounds were evaluated in these procedures: 2 - (p - dimethylaminophenyl) - 3,6 - dimethylbenzothiazolium chloride 1:2 complex with urea; 2 - (p - dimethylaminophenyl) - 3,6 - dimethylbenzothiazolium chloride 1:2 complex with thiourea; and 2 - (p - dimethylaminophenyl) - 3,6 - dimethylbenzothiazolium chloride 1:1 complex with guanidine hydrochloride.

The benzothiazolium compound which is employed as a starting material in the preparation of the complexes of the present invention is itself prepared in known procedures. In one such procedure, an aminobenzenethiol compound of the formula:

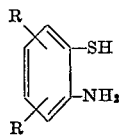

is reacted at temperatures of about 150° C. with an aminobenzene compound of the formula:

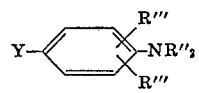

In the aminobenzene compound, Y can be any of numerous acidic functional groups, such as carboxy (—COOH),

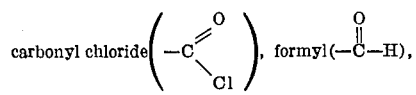

cyano (—CN), and the like; generally, an aminobenzene reactant wherein Y represents formyl is employed. The reaction goes forward in the presence or absence of an inert liquid reaction medium to prepare a benzothiazole compound of the formula:

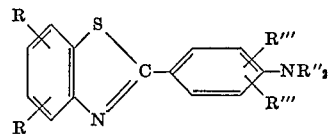

This benzothiazole compound is separated by sublimation, solvent extraction, or recrystallization.

Thereafter, in those starting materials wherein each R" symbol represents primary loweralkyl, the separated benzothiazole compound is quaternized by reaction with an appropriate quaternizing agent, such as a primary loweralkyl halide, diprimary loweralkyl sulfate, or primary loweralkyl ester of p-toluenesulfonic acid. In many instances, the quaternizing agent, particularly the primary loweralkyl halide, is conveniently prepared in situ. For example, the quaternizing agent methyl chloride can be prepared in situ by employing methanol and hydrochloric acid. In the quaternization reaction, it is preferable to employ one equimolecular quantity of benzothiazole compound and one or more equimolecular quantities of quaternizing agent. Good results are obtained when the quaternization is conducted at temperatures of from about 100° to about 160° C. Preferably, the quaternization is conducted in an inert liquid reaction medium; in many instances, an excess amount of one of the quaternizing agents or of one of the reagents employed to prepare the quaternizing agent in situ is employed as inert liquid reaction medium. As a result of such quaternzation procedures, there is prepared the starting benzothiazolium compound wherein X represents halide, —R'SO$_4$, or

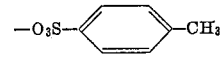

This benzothiazolium compound is separated from the reaction mixture in any of the conventional separation techniques. For example, the benzothiazolium compound sometimes precipitates and is separated by filtration. In other instances, the reaction mixture containing the benzothiazolium compound as a product becomes a solid mass during the course of the reaction, and the reaction product is taken up in, and recrystallized from, a solvent, such as acetone, an alcohol, which can be methanol, ethanol, or isopropanol, or a mixture of such alcohol with another solvent, such as ether or benzene. In yet other instances, the benzothiazolium compound is extracted from the reaction mixture with water, a "salting out agent" added to the resulting aqueous extract to precipitate the product, and the precipitated product separated by filtration. In such procedures, the salting out agent can be any salt having as an anion the desired X moiety. Commonly, sodium or potassium salts are employed as salting out agents. Thus, in this procedure are prepared and separated all of the compounds to be employed as a benzothiazolium starting material in preparing the complexes of the present invention. These compounds are purified, if desired, by conventional procedures, such as recrystallization from solvent.

In another procedure for the preparation of those starting materials wherein each R" symbol represents primary loweralkyl, a nitrobenzene compound of the formula

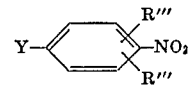

wherein the symbol Y has the same meaning as above defined, is reacted with the aminobenzenethiol compound as previously defined to prepare an intermediate compound of the formula:

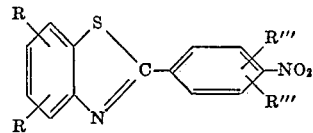

The nitro moiety of this intermediate compound is reduced, in any of various procedures, such as reaction of the compound with iron and hydrochloric acid, to prepare a product of the formula:

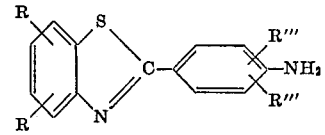

This product is thereafter reacted with an appropriate primary loweralkylating agent, or with two different primary loweralkylating agents simultaneously or successively, to prepare the benzothiazole compound as above defined, which is quaternized and separated in the manner hereinabove discussed to prepare all of the benzothiazolium starting compounds. This procedure is most conveniently employed for only those benzothiazolium compounds wherein both primary loweralkyl groups on the amino nitrogen atom are the same.

Those starting materials wherein at least on R" symbol represents hydrogen are prepared by a modification of the foregoing procedures. Material of the following formula

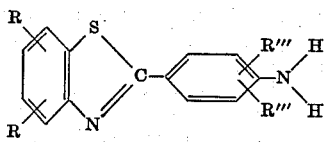

is prepared as taught hereinabove. This material can be reacted with a primary loweralkylating agent as previously described to obtain the corresponding material wherein one of the amino hydrogen atoms is replaced by primary loweralkyl:

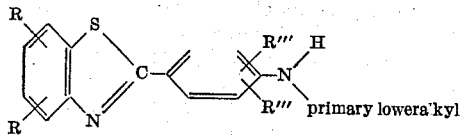

Either material is then reacted with acetic anhydride to obtain a compound in which the amino nitrogen is hindered;

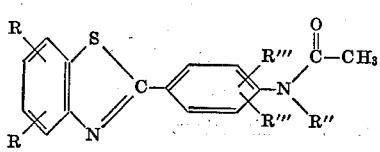

The ring nitrogen of this compound is then quaternized, as discussed foregoing, and the resulting quaternized material reacted with hydrochloric acid to obtain the desired starting material as a chloride

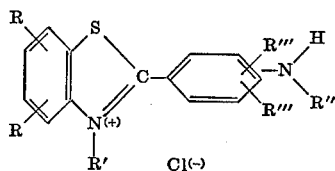

Complexes comprising that benzothiazolium compound which is of the formula

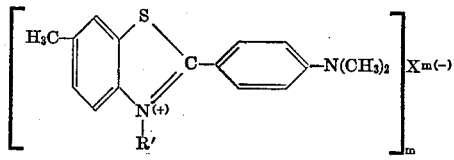

and especially those wherein X represents halide, —HSO₄, —R'SO₄, —H₂PO₄,

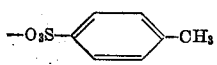

or —O₃SCH₃, constitute a preferred embodiment because of the directness of their synthesis and because of the exceptional performance of methods and compositions containing them in accordance with the present invention. The benzothiazolium compound in such complexes is conveniently prepared in yet another known procedure. In this procedure, p-toluidine is heated with sulfur, in the proportion of two moles of p-toluidine to 4 or 5 atoms of sulfur and at elevated temperatures such as, about 200° C. As a result, there is prepared a mixture of products, including a product of the formula:

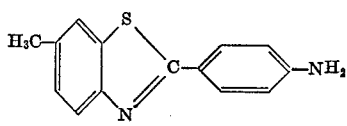

This product is separated from the reaction mixture and from the other products in known procedures and thereafter reacted with a primary loweralkylating agent, and the resulting alkylated benzothiazole product is quaternized according to the procedures hereinabove discussed.

When all R' and R" moieties in a given benzothiazolium material are the same, it is convenient to conduct the primary loweralkylation and the quatrenization steps concurrently. In such procedures, a compound of the formula

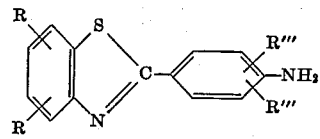

is employed. For example, when all of the R' and R" moieties in a given compound represent —CH₃, the above compound is reacted with methanol and hydrochloric or sulfuric acid at temperatures of about 150–200° C. Preferably, the reaction is conducted under superatmospheric pressure. When sulfuric acid is employed in this method, the yield of product is increased by supplying to the reaction mixture a small catalytic amount of bromide ion, in the form of an alkyl or aralkyl bromide or a soluble inorganic bromide.

I claim:
1. Complex of (A) a benzothiazolium compound of the formula

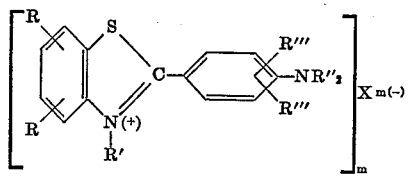

and (B) a compound selected from the group consisting of urea, thiourea, guanidine, guanidine hydrochloride, and biuret, wherein, in said benzothiazolium compound, X represents a pharmaceutically acceptable anion; each R independently represents a member selected from the group consisting of hydrogen, loweralkyl, loweralkoxy, bromo and chloro; R' represents primary loweralkyl; each R" independently represents a member selected from the group consisting of hydrogen and primary loweralkyl; each R'" independently represents a member selected from the group consisting of hydrogen, chloro, methoxy, and methyl; and m represents an integer equal to the valence of the anion X.

2. The complex of claim 1 wherein the benzothiazolium compound is 2-(p-dimethylaminophenyl)-3,6-dimethbenzothiazolium chloride, the urea compound is urea, and one molecule of benzothiazolium compound is present for each molecule of urea compound.

3. The complex of claim 1 wherein the benzothiazolium compound is 2-(p-dimethylaminophenyl)-3,6-dimethylbenzothiazolium chloride, the urea compound is urea, and one molecule of benzothiazolium compound is present for each two molecules of urea compound.

4. The complex of claim 1 wherein the benzothiazolium compound is 2-(p-dimethylaminophenyl)-3,6-dimethylbenzothiazolium chloride, the urea compound is thiourea, and one molecule of benzothiazolium compound is present for each two molecules of urea compound.

5. The complex of claim 1 wherein the benzothiazolium compound is 2-(p-dimethylaminophenyl)-3,6-dimethylbenzothiazolium chloride, the urea compound is guanidine hydrochloride, and one molecule of benzothiazolium compound is present for each molecule of urea compound.

6. The complex of claim 1 wherein the benzothiazolium compound is 2-(p-dimethylaminophenyl)-3,6-dimethylbenzothiazolium chloride, the urea compound is biuret, and one molecule of bnezothiazolium compound is present for each molecule of urea compound.

7. The complex of claim 1 wherein the benzothiazolium compound is 2-(p-dimethylaminophenyl)-3,6-dimethylbenzothiazolium bromide, the urea compound is urea, and one molecule of benzothiazolium compound is present for each molecule of urea compound.

8. The complex of claim 1 wherein the benzothiazolium compound is 2-(p-dimethylaminophenyl)-3,6-dimethylbenzothiazolium iodide, the urea compound is urea, and one molecule of benzothiazolium compound is present for each molecule of urea compound.

9. The complex of claim 1 wherein the benzothiazolium compound is 2-(4-dimethylamino-m-tolyl)-3-methylbenzothiazolium chloride, the urea compound is urea, and one molecule of benzothiazolium compound is present for each molecule of urea compound.

10. The complex of claim 1 wherein the benzothiazolium compound is 2 - (p - dimethylaminophenyl) - 6-chloro-3-methylbenzothiazolium iodide, the urea compound is urea, and two molecules of benzothiazolium compound are present for each molecule of urea compound.

11. The complex of claim 1 wherein the benzothiazolium compound is 2-(p-dimethylaminophenyl)-3-methylbenzothiazolium chloride, the urea compound is biuret, and one molecule of benzothiazolium compound is present for each molecule of urea compound.

12. The complex of claim 1 wherein the benzothiazolium compound is 2-(p-dimethylaminophenyl)-3,5,6-trimethylbenzothiazolium chloride, the urea compound is urea, and one molecule of benzothiazolium chloride is present for each molecule of urea compound.

13. The complex of claim 1 wherein the benzothiazolium compound is 2-(p-dimethylaminophenyl)-3,5,6-trimethylbenzothiazolium chloride, the urea compound is urea, and one molecule of benzothiazolium compound is present for each two molecules of urea compound.

14. The complex of claim 1 wherein the benzothiazolium compound is 2-(p-dimethylaminophenyl)-3,6-dimethylbenzothiazolium acetate, the urea compound is urea, and one molecule of benzothiazolium compound is present for each molecule of urea compound.

15. The complex of claim 1 wherein the benzothiazolium compound is 2-(p-dimethylaminophenyl)-3,6-dimethylbenzothiazolium tartrate, the urea compound is urea, and one molecule of benzothiazolium compound is present for each molecule of urea compound.

16. The complex of claim 1 wherein the benzothiazolium compound is 2-(p-dimethylaminophenyl)-3,6-dimethylbenzothiazolium citrate, the urea compound is urea, and one molecule of benzothiazolium compound is present for each molecule of urea compound.

No references cited.

ALEX MAZEL, *Primary Examiner.*

HENRY R. JILES, *Examiner.*